United States Patent [19]

Spagna et al.

[11] Patent Number: 6,021,427

[45] Date of Patent: *Feb. 1, 2000

[54] METHOD AND SYSTEM FOR PREVENTING ROUTING MAELSTROM LOOPS OF AUTOMATICALLY ROUTED ELECTRONIC MAIL

[75] Inventors: Richard Spagna, Boca Raton, Fla.; Arun Rao, Dallas, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,940

[22] Filed: May 22, 1997

[51] Int. Cl.$^7$ .................................................. G06F 13/00
[52] U.S. Cl. .......................... 709/206; 709/245; 709/232; 379/207
[58] Field of Search ............................... 395/200.36, 673; 709/206, 4, 245, 232; 379/207

[56] References Cited

U.S. PATENT DOCUMENTS

| | | | |
|---|---|---|---|
| 4,244,672 | 1/1981 | Lund | 198/350 |
| 4,853,869 | 8/1989 | Durts, Jr. et al. | 700/227 |
| 5,377,354 | 12/1994 | Scannel et al. | 395/673 |
| 5,388,049 | 2/1995 | Sansone et al. | 705/406 |
| 5,619,648 | 4/1997 | Canale et al. | 395/200.36 |
| 5,751,960 | 5/1998 | Matsunaga | 395/200.36 |

OTHER PUBLICATIONS

IBM Technical Disclosure Bulletin, vol. 35, No. 1B—Jun. 1992 "Automatic Routing, Distribution, and Printing of Facsimile Documents".

IBM Technical Disclosure Bulletin, vol. 37, No. 02A—Feb. 1994 "Automatic Recipient–Based Mail Routing for the Traveling User".

Bryan Costales (sendmail) Nov. 1993.

*Primary Examiner*—Dung C. Dinh
*Assistant Examiner*—Chuong Ho
*Attorney, Agent, or Firm*—Steven J. Meyers; Steven J. Soucar; Gunster, Yoakley, Valdes-Fauli & Stewart, P.A.

[57] ABSTRACT

A method and system for preventing routing maelstrom loops of automatically routed electronic mail which is operational with intelligent agents and computer-processor hardware components, and includes a software based solution comprising a processor readable code of instructions. The code of instructions generally comprise a routine for tagging processed e-mail message with a system generated special identifying tag revealing each source subscriber, a routine for ascertaining whether a received message intended for automatic routing contains any special tag and a corresponding routine for deciding whether any of the special tags contain the current source subscriber's identification before exercising any routing rules against the message. If the subscriber's ID is listed in the particular e-mail being routed, then the system of the invention determines that a complete loop has been made and terminates further transmission since the next target subscriber has already received the message. Otherwise, the routing of the mail is executed.

15 Claims, 7 Drawing Sheets

METHOD AND SYSTEM FOR PREVENTING ROUTING MAELSTROM LOOPS OF AUTOMATICALLY ROUTED ELECTRONIC MAIL

BACKGROUND OF THE INVENTION

1. Field of the Invention

This invention relates generally to a method and system for managing and processing electronic mail, such as data and word objects (generally referred to as e-mail messages), and more particularly, to a software solution comprising a method and system for preventing routing maelstrom loops during automatic e-mail transmissions by tagging the e-mail messages with a subscriber identifier which is used to determine whether a target subscriber has already received the tagged message.

2. Description of the Prior Art

Automatically routing mail to target subscribers is becoming a typical feature in many electronic mail (e-mail) systems. However, without proper prevention techniques, infinite routing loops are possible. Infinite routing loops can quickly bring down systems and their networks. Thus, the instant invention addresses these side-affects by providing a system and method for preventing infinite loops, or maelstroms, in automatically transmitted e-mail.

E-mail generally comprises user generated messages, i.e. data objects or word objects ("e-mail messages"), that are sent from one subscriber ("source") to another subscriber ("target"). Oftentimes, a target subscriber becomes a source subscriber when they automatically route a received e-mail message to another designated subscriber. E-mail messages can include letters, memos, appointments, task, notes or anything else which may be electronically transmitted within or between computer based systems. E-mail has been conventionally transmitted manually via user initiated commands, such as "send," "reply" or "copy."

A popular feature now appearing in most e-mail systems is the automatic handling of e-mail in accordance with previously prescribed commands, or rules. A subscriber specifies the rules to be adhered to for automatically routing e-mail received or originated by them. These rules govern the manner, criteria and hierarchy by which the program manager performs its task. The program manager utilizes an intelligent software agent, or comparable medium known in the art, to execute the assigned rules.

A popular strategy is to automatically forward mail to a target user based on either the senders identity (ID) or some key word related to the subject of the e-mail message. For instance, a user "X" may have a rule that says: "if e-mail is received from "A" then forward it to "Y." The problem with the automatic transfer of e-mail is that a continuous routing loop, referred to as a maelstrom, may be formed. A maelstrom occurs as follows:

Assume three subscribers X, Y and Z have one rule each.

(1) Subscriber X: if e-mail arrives from Z, then forward to Y;

(2) Subscriber Y: if e-mail arrives from X, then forward to Z; and (3) Subscriber Z: if e-mail arrives from Y, then forward to X.

Figure 1:
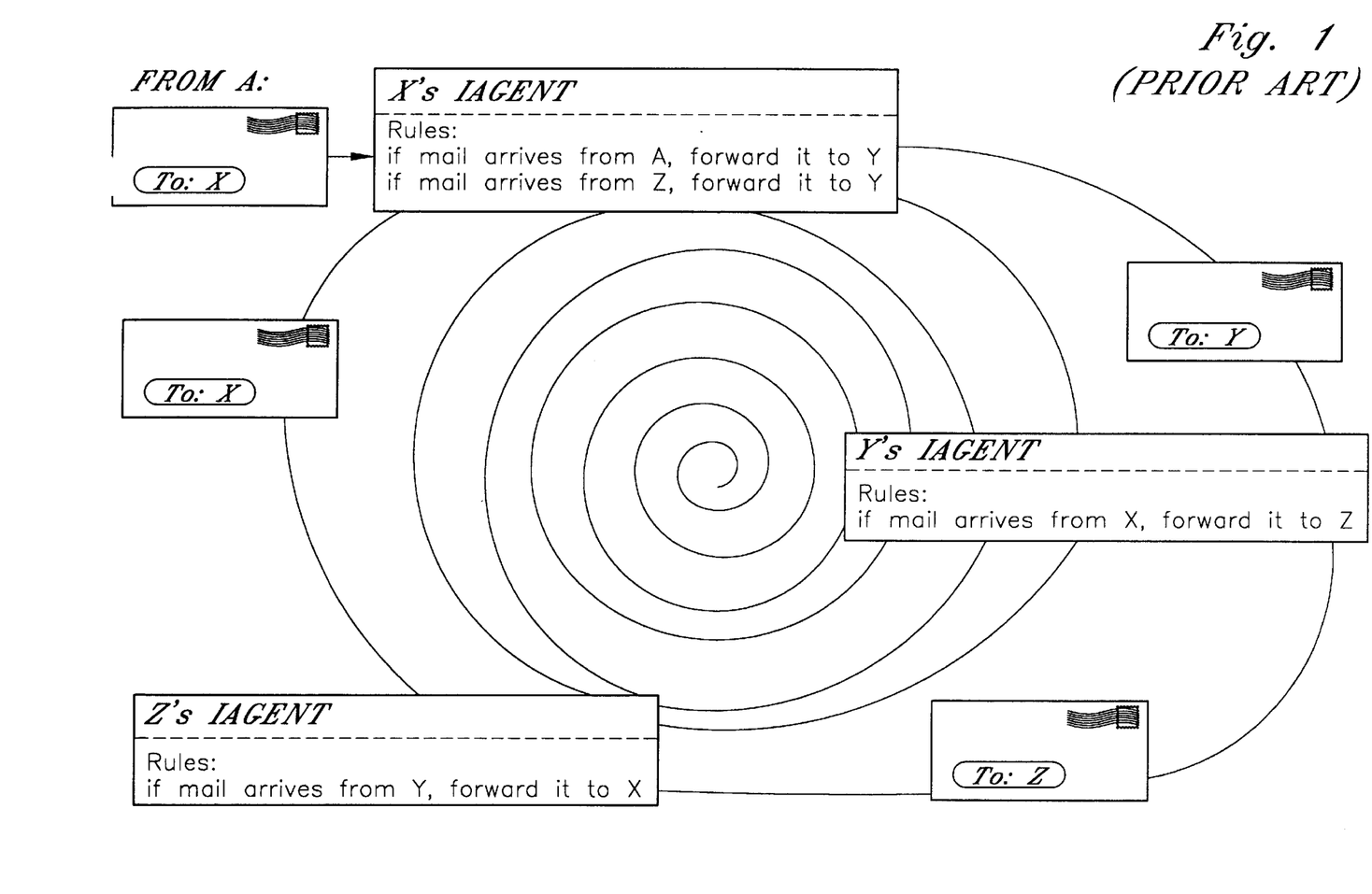
FIG. 1 is a pictorial flow diagram depiction of prior art automatic e-mail routing and a resulting mail maelstrom loop.

As seen in FIG. 1, a continuous routing loop is formed whereby each rule is repeated forever. When maelstrom loops occur, the system where the mailboxes for X, Y and Z reside will eventually be brought down as the file system runs out of space for holding the continuously received e-mail. If the mailboxes are on different systems, the corresponding network experiences additional loading which severely hampers traffic flow. This is because the messages moving between the systems increase in size each time they are forwarded. In light of these side affects, there exist a need for a system solution capable of preventing these infinite e-mail loops.

Rules for governing the manner, criteria and hierarchy in which software performs its task are read and executed by intelligent software agents ("agents"). Various desk top management techniques have evolved through the use of these agents to address the association of rules and e-mail actions. Agents comprise software that is delegated authority to perform preassigned task in accordance with these predetermined rules. For instance, an agent may perform a task such as receiving an incoming message and routing it to the appropriate target subscriber. These agents may also be used to filter information, prioritize messages, distribute business forms and make videos or screen activities. Intelligent agents attempt to replicate the actions of people performing information delivery task by following the rules. Accordingly, intelligent software agents, acting on behalf of the user, execute application work flows, such as delivering e-mail, and interact with computer applications, phones and fax resources to perform transmissions typically requiring user intervention.

Each piece of forwarded e-mail includes a header and a body. The body contains the message of interest and the header provides transmission information, such as the destination address of the target subscriber. However, nothing is provided to determine whether a target subscriber has already received an automatically forwarded e-mail message. Thus, continuous looping of automatically routed e-mail can occur under conditions such as those shown in FIG. 1. Even though the use of intelligent software agents and rules for handling objects, such as e-mail, is becoming more prevalent, this advanced technology has not been fully utilized. As intelligent agents only perform task in accordance with the rules given, agents currently cannot solve the problems associated with maelstrom loops. It has been discovered that agents and current e-mailing techniques may be modified and used in a new, useful and non-obvious manner to prevent detrimental mail maelstrom loops.

Upon review of the background art, nothing addresses or solves the above noted problems as contemplated by the instant invention. In French patent, FR2705180, a semi-automatic routing system for facsimile data is disclosed and designed to minimize routing errors, but does not prevent mail maelstroms. A value mail monitoring system for postal use is disclosed in U.S. Pat. No. 5,588,049, and comprises a dispatch and routing tag printed with destination information, the number of mail pieces and the weight of the parcel. The '049 patent applies to the general postal system. Japanese patent, JP03245881, discloses a loop delay feed path which rearranges the section order of paper mail relative to a particular delivery route. Finally, Japanese Patent JP07185470 discloses a route assembly device that comprises a software control unit which circulates regular paper mail in a loop conveyance path to aid postal workers in sorting mail. Despite the problems associated with automatically routed e-mail, i.e. maelstrom loops, nothing known in the background art addresses or offers a valuable solution. Consequently, there exists a need for a method and means for obviating the system degradation caused by maelstrom loops.

SUMMARY OF THE INVENTION

In accordance with the foregoing, it is a primary object of the instant invention to provide a method and means for preventing and obviating continuance routing loops, or maelstroms, of automatically routed e-mail.

It is another object of the instant invention to provide a software solution that prevents continuance routing loops of automatically routed e-mail.

It is a further object of the instant invention to provide a method and means for breaking e-mail maelstrom loops that are adaptable to current standard e-mail and object transfer systems.

It is additional object of the instant invention to provide a method and means for breaking e-mail maelstrom loops that are invisible to the user and which does not disrupt the presentation of the e-mail message to the user.

Based on these and other objects, the instant invention may provide or is operational with intelligent agents and computer-processor hardware components, and includes a software based solution comprising a processor readable code of instructions. The code of instructions is integrated as part of the agent code and generally comprises a routine for tagging processed e-mail message with a system generated special identifying tag revealing each source subscriber, a routine for ascertaining whether a received message intended for automatic routing contains any special tag and a corresponding routine for deciding whether any of the special tags contain the current source subscriber's identification before exercising any rules against the message. The instruction code is processed by the subscriber's intelligent agent instructing the agent on whether it is to adhere to the routing rules. Before the source agent processes automatically routed mail, the source agent checks each header to ascertain whether the e-mail has already been processed by it. If the subscriber's ID is listed in the particular e-mail being routed, then the system of the invention determines that a complete loop has been made and terminates further transmission since the next target subscriber has already received the message. Otherwise, the processing of rules that the subscriber has given to the agent occurs. These rules are the subscriber's instructions to the agent as to how to potentially route its mail. Prior to routing e-mail messages, the cognizant source subscriber's ID is placed in the header syntax to mark the message as being received. The operation of the invention is invisible to the users so that the viewability of the e-mail message is not affected.

In the preferred embodiment and implementation, the invention is advantageously used in automatic e-mail routing in a network of client/server units that offer automation of e-mail. The instant invention is also employable between networks and other types of communication systems having automatic message routing features and capabilities. The instant invention operates in a server unit and includes a processor/computer readable code of instructions which is storable on a medium useable by the processor/computer. When an intelligent agent processes an e-mail message for a source subscriber, it automatically passes it on to a designated target subscriber and places an identifying tag in the header of the forwarded message identifying the source subscriber on whose behalf the e-mail message is being transmitted. It should be noted that when an automatically forwarded message is automatically forwarded to other subscribers, an additional header is created each time in a stacked listing corresponding to the order of transmission. For each message received, the tag identifier routine looks in each header for subscriber ID's and the corresponding routine determines whether the current subscriber's ID is present. If the e-mail message eventually makes its way back to a previously designated source or target subscriber that has already seen the message, then the intelligent agent, via these routines, will recognize this when it finds its subscriber's tag in the message header.

As subscribers sometimes alter an automatically received e-mail message before manually forwarding it to a target subscriber, the preferred system and method of the invention includes an instruction code routine to cover this contingency. When an e-mail message has been altered in any way and subsequently forwarded, the e-mail is treated as an entirely new message by the mail system. In accordance with the instant invention, manually forwarded messages are not tagged and new automatically forwarded messages do not yet contain an identifier tag. For newly created and automatically forwarded messages, a new set of tags will be established. Moreover, headers in a repeatedly routed message are arranged by a first-in, last-out type of order. The instruction code responsible for detecting whether a subscriber's mail system has previously seen a message essentially knows this and stops searching an e-mail's headers as soon as it reaches a header that does not contain a tag. This occurs whether the tagless header comprises the first header or any subsequently embedded header formed through repeated automatic forwarding. With this approach, e-mail messages that should be treated as new e-mail will be handled as new by the invention.

The instant invention has several advantages. It capitalizes on existing standards, mimics conventionally known mail delivery, and provides a more efficient solution compared to alternatives. Current e-mail standards allow subscribers to add their own tags to headers of e-mail with the widely accepted "x-xxx:" tag format. The instant invention preferably adopts this format, but may adopt other formats without departing from the scope and spirit of the instant invention. As mail display programs adhering to the accepted standard do not reveal the "x-xxx:" field to the user, adhering to this standard for tagging automatically routed e-mail will not disrupt the presentation of the mail to the user. An additional advantage is the invention's ability to mimic real life. With the ability to detect where an automatically forwarded message begins and ends, messages that are manually forwarded and contain automatically forwarded messages are processed as if they are new messages. Finally, there does not appear to be any alternative solutions for preventing maelstrom loops in automatically routed e-mail and the instant invention can be incorporated in any system that has the ability to automatically handle messages.

In accordance with these and other objects which will become apparent hereinafter, the instant invention will now be described with particular reference to the accompanying drawings.

DESCRIPTION OF THE PREFERRED EMBODIMENTS

With reference to the drawings, FIGS. 2–6 depict the preferred embodiments of the instant invention which is generally characterized by the reference numeral 10. In FIG. 1, a prior art system is shown for routing e-mail automatically. As shown, conventional techniques for automatically routing e-mail messages 12 do not provide any provision for preventing infinite routing loops which results in the continuous maelstrom loop shown.

Figure 2:
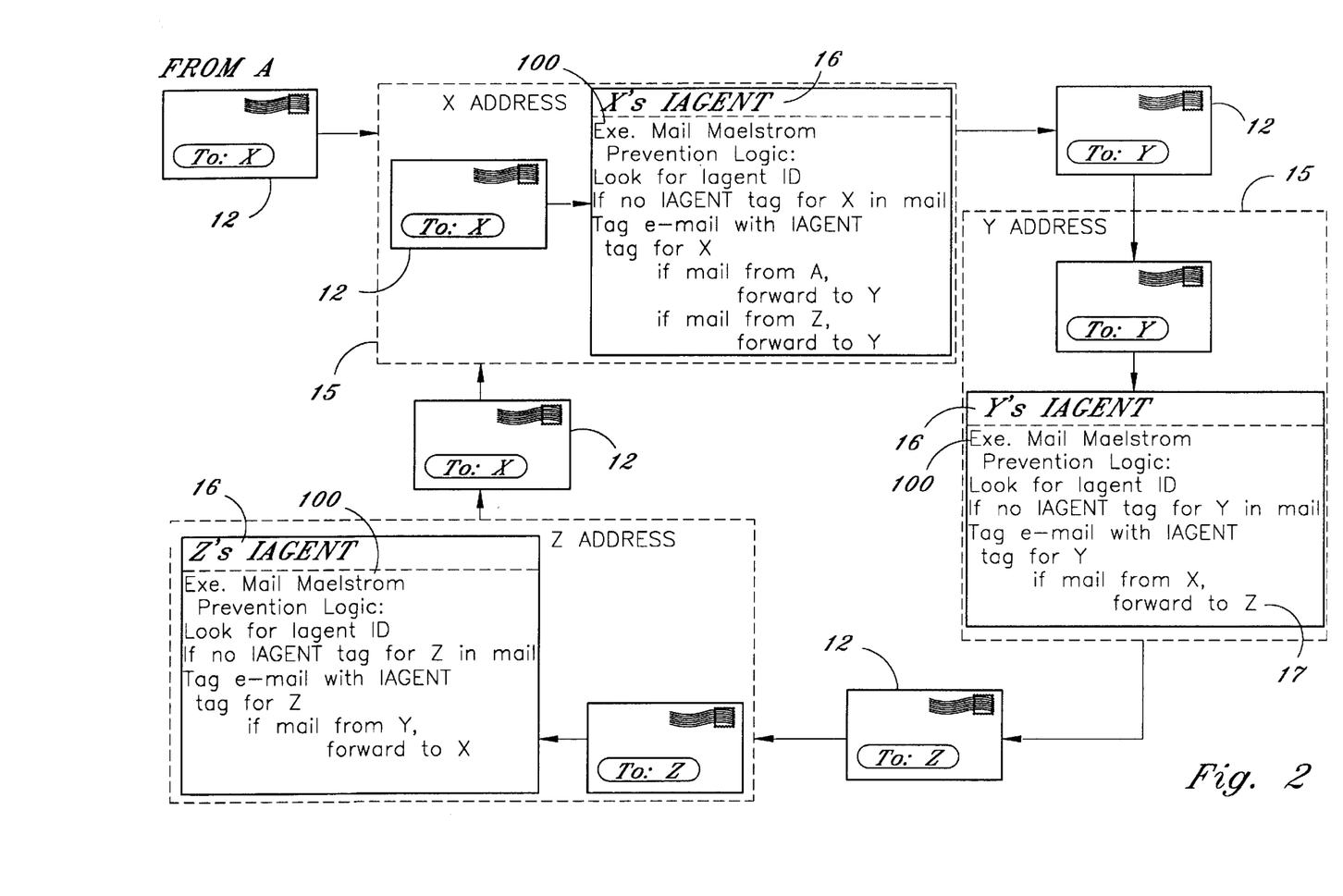
FIG. 2 is a pictorial flow diagram depiction of automatic e-mail routing employing the maelstrom prevention logic of the instant invention, showing a conventional letter for illustrative purposes.
Figure 3:
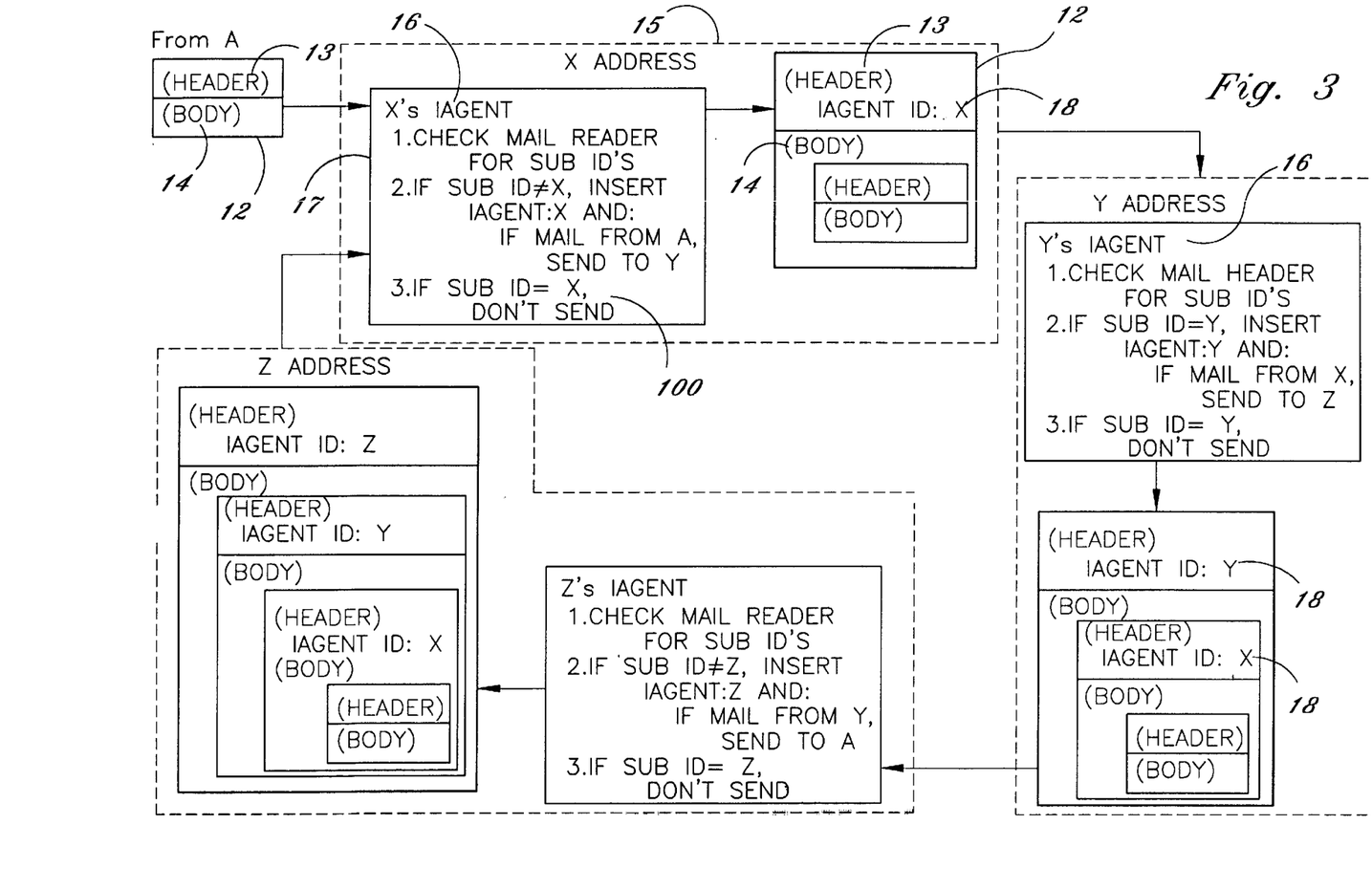
FIG. 3 is a pictorial flow diagram of automatic e-mail routing employing the maelstrom prevention logic of the instant invention, illustrating interaction between the logic and intelligent agents and the stacking of messages as e-mail is automatically routed.
Figure 5:
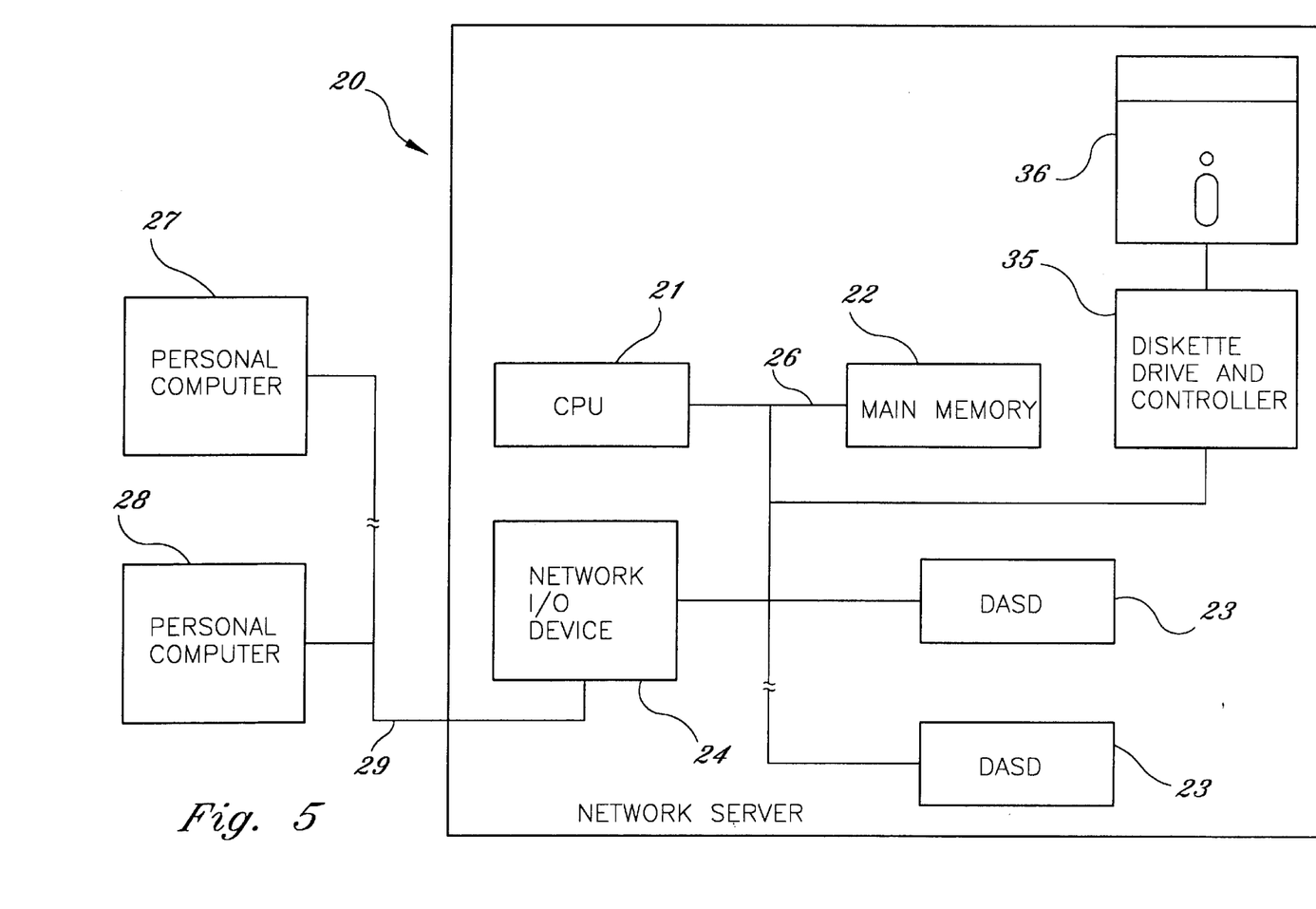
FIG. 5 is a block diagram illustrating a client/server network in its simplest form.

With reference to FIGS. 2, 3 and 5, the instant invention 10 is employable in a client/server network based system and comprises a processor readable code of instructions 100 which includes code for interfacing with the code of at least one intelligent software agent 16 (or "IAGENT" as depicted in the drawings). The intelligent agent 16 allows a user to automatically send e-mail to other designated subscribers by following preconfigured rules 17. Any intelligent agent known in the art may be used, but a preferred agent is discussed herein and shown in FIG. 6. The instant invention provides an additional feature to automatic e-mail routing techniques which cooperates with intelligent agents 16 to prevent infinite routing loops.

Figure 6:
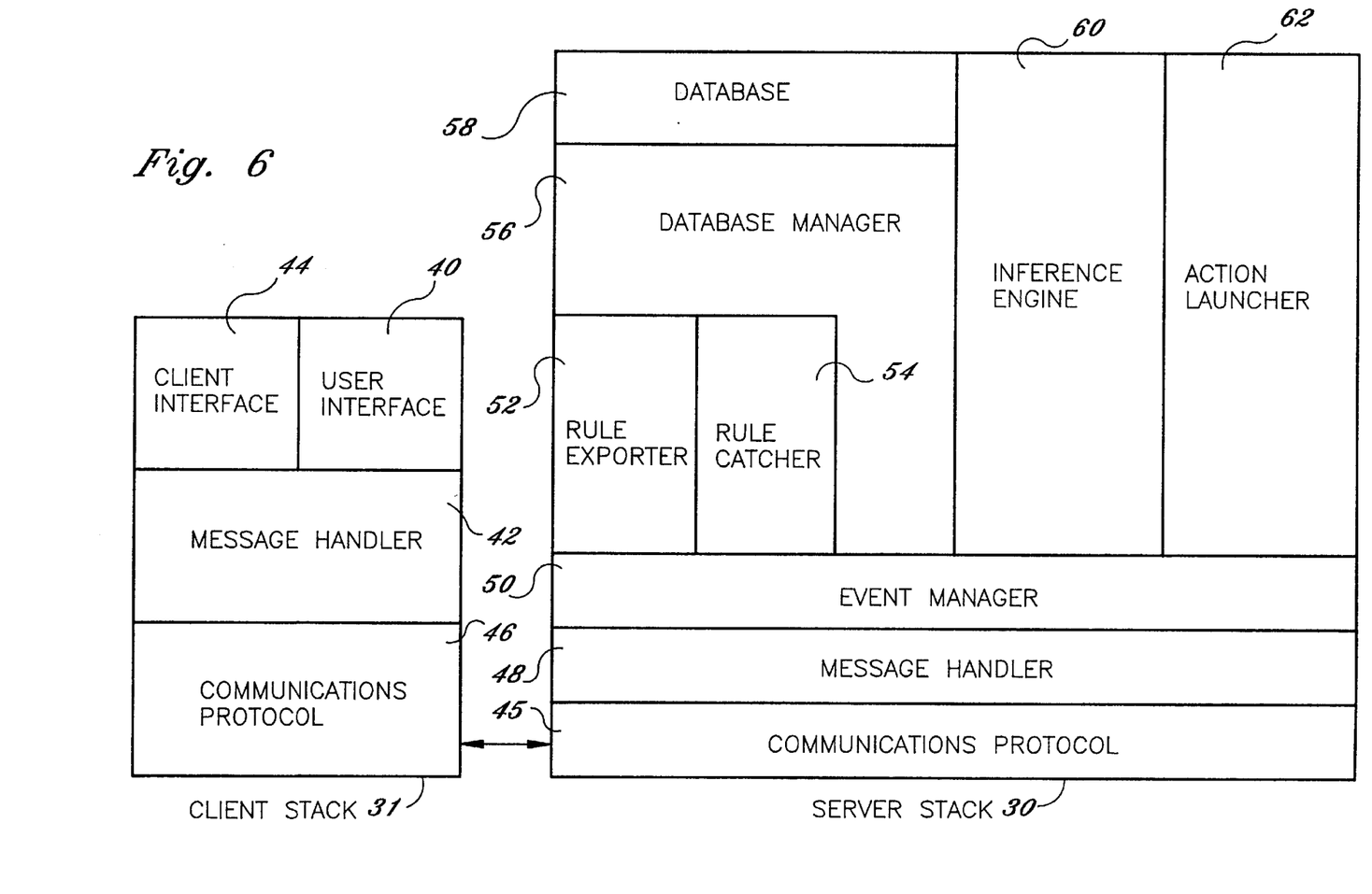
FIG. 6 is a block diagram illustrating one form of the intelligent agent of the present invention adapted for use in the client/server network of FIG. 5.

In the preferred embodiment of the invention, the agent 16 employed is used on Multipurpose Internet Mail Extension (MIME) messages, but other agents and mail extension techniques known in the art may be employed. Each subscriber has an agent which contains a user interface which permits the user to observe and modify operations within the agent 16 by assigning rules 17 which the agent adheres to, as is known in the art. Although a user may access and modify the rules 17 by which an agent 16 operates, the instant invention provides a method, system and underlying set of rules (distinct from the rules 17 for forwarding mail) which is invisible to the user and not in need of altering. That is, the instant invention is permanent and unmodifiable by the user. In accordance with the invention, the agent 16 handles e-mail routing for its owner in the client/server network while independently monitoring the status of e-mail routing to prevent repeated mailings and continuous maelstrom loops. Client/server networks are well known in the art and such a network is illustrated in FIG. 5.

The instant invention 10 is adapted for operation with intelligent agents 16 and computer-processor hardware components in a client/server network, as shown in FIG. 5. The preferred embodiment provides a software based solution comprising a processor readable code of instructions 100 referenced in FIG. 2 as the e-mail maelstrom prevention logic 100. As seen in FIGS. 3 and 4, the e-mail maelstrom prevention logic 100 generally comprises a routine 122 for tagging e-mail messages with an agent generated identifier tag 18 (IAGENT ID) before forwarding so as to reveal each source subscriber, a routine 116–118 for ascertaining whether a received message intended for automatic routing contains any IAGENT ID's 18 and a corresponding routine 114–126 for deciding whether any of the embedded messages contain the current subscribers identifiation IAGENT ID 18 before exercising any rules against the message. The maelstrom prevention logic 100 is processed by each subscriber's intelligent agent 18 instructing the agent on whether it is to adhere to the routing rules. If the agent 16 determines it should process the routing rules provided to it by its owner, it will place the IAGENT ID 18 in any messages that it forwards.

Each subscriber has an IAGENT ID 18 which is placed in the header 13 of a message if the subscriber is the cognizant source subscriber and the message 12 is set for automatic forwarding. The cognizant source subscriber is the subscriber currently in possession of the e-mail message which it intends to automatically forward. A cognizant source subscriber's IAGENT ID 18 is placed in the header syntax 13 to indicate that the message has already been received and forwarded. Before the system processes automatically routed mail 12, the source agent 16 checks each header 13 to ascertain whether the e-mail 12 has already been processed by it. If the subscriber's ID 18 is listed in the particular e-mail being routed, then the system of the invention determines that a complete loop has been made and terminates further transmission since the next target subscriber has already received the message. Otherwise, the routing of the mail 12 is executed. The operation of the invention is invisible to the users so that the viewability of the e-mail message is not affected.

The marking and routing of messages is shown in FIGS. 2 and 3. Referring to FIG. 2, the e-mail 12 is pictorially depicted as a conventional letter for illustrative purposes. When e-mail 12 is received and intended for automatic forwarding to a target subscriber pursuant to the agent's 16 rules, the cognizant agent 16 executes the e-mail maelstrom prevention logic 100. The maelstrom prevention logic 100 looks for IAGENT ID's 18 in the e-mail message headers 13 and tags a newly created header with the cognizant subscriber's IAGENT ID 18, provided the message had not been previously forwarded by this subscribers intelligent agent. If the subscriber's IAGENT ID 18 is not found, then the subscriber's agent 16 executes the rules 17. Before forwarding the e-mail 12 pursuant to the rules 17, a new header 13 is created and the subscriber agent 16 tags the header with its IAGENT ID 18. This process is repeated for each subscriber, i.e. X, Y and Z. In accordance with the subscribers' rules 17 in FIG. 2, e-mail received by X from A is tagged and automatically routed to Y. Subscriber Y initiates and executes the maelstrom prevention logic 100. If Y's agent 16 does not find its IAGENT ID 18, then it forwards the e-mail 12 to subscriber Z in accordance with subscriber Y's rules 17. Likewise, subscriber Z has an agent 16 which executes the maelstrom prevention logic 100 to ascertain whether its ID 18 is present in any of the message headers before forwarding the e-mail 12 back to X. After a complete loop, each subscriber's agent is present in the message 12 such that X's agent 16 upon execution of the maelstrom prevention logic 100 will find its IAGENT ID 18. When the agent 16 finds its IAGENT ID 18 it knows that it has already seen and forwarded the message 12 pursuant to its rules 17. Consequently the maelstrom prevention logic 100 signifies to the intelligent agent that any routing of the e-mail should not be allowed.

The foregoing process is repeated for each subscriber listed in a particular routing sequence or loop, i.e. until an agent 16 determines that it has already processed the particular message 12. A more detailed illustration of the foregoing process is shown in FIG. 3. With reference thereto, each time an e-mail message 12 is forwarded, a new header 13 and body 14 is created and the received message is embedded in the newly created body. If the e-mail message 12 is to be forwarded by the agent in accordance with the assigned subscriber rules, the agent's 16 ID 18 is placed in the newly created header 13, as more fully shown in FIG. 4b by blocks 130–134. With reference to FIG. 3, the maelstrom prevention routine 100 first checks each header 13 in the incoming message 12 to determine if any IAGENT ID's 18 are present and correlate with the cognizant subscriber's agent ID. If the subscriber agent's ID is not found then the IAGENT ID 18 is inserted into the new header and the message is allowed to be processed through the cognizant source subscribers rules. If the subscriber's IAGENT ID 18 is found, then the message is not allowed to be processed through the cognizant source subscribers rules. For instance, when a message 12 is received by X at the X Address 15 and "IAGENT: X" is not found, then "IAGENT: X" is inserted in the header 18 and the message 12 is sent to Y at the Y Address. Since Y has a rule 17 for forwarding e-mail messages 12 received from X to Z, Y's agent 16 checks for "IAGENT: Y" in the headers before routing the e-mail. If Y's ID 18 is not found, then the e-mail 12 is sent to Z. As Z has a rule 17 requiring mail 12 received from Y to be forwarded to X, Z repeats the same steps. When the message 12 is reacquainted with X, X's agent 16 will find its ID 18 in the deeply embedded header where it was originally placed and will thus know not to route the mail 12.

The agents 16 via the routine 100 check the most recently created headers first in the stack of embedded messages 12. Each header 13 is checked until one is found without an IAGENT ID 18, all headers have been checked or the cognizant agent's IAGENT ID 18 is located. A header 13 will not have an IAGENT ID 18 listed if the message is newly created, manually forwarded or edited. As subscribers sometimes alter an automatically received e-mail message before manually forwarding it to a target subscriber, the preferred system and method of the invention includes instruction code to cover this contingency. When an e-mail message has been altered in any way, the e-mail is sent manually and in essence treated as a new message. In accordance with the instant invention, manually forwarded messages 12 are not tagged and new automatically forwarded messages do not yet contain an identifier tag.

Figure 4A:
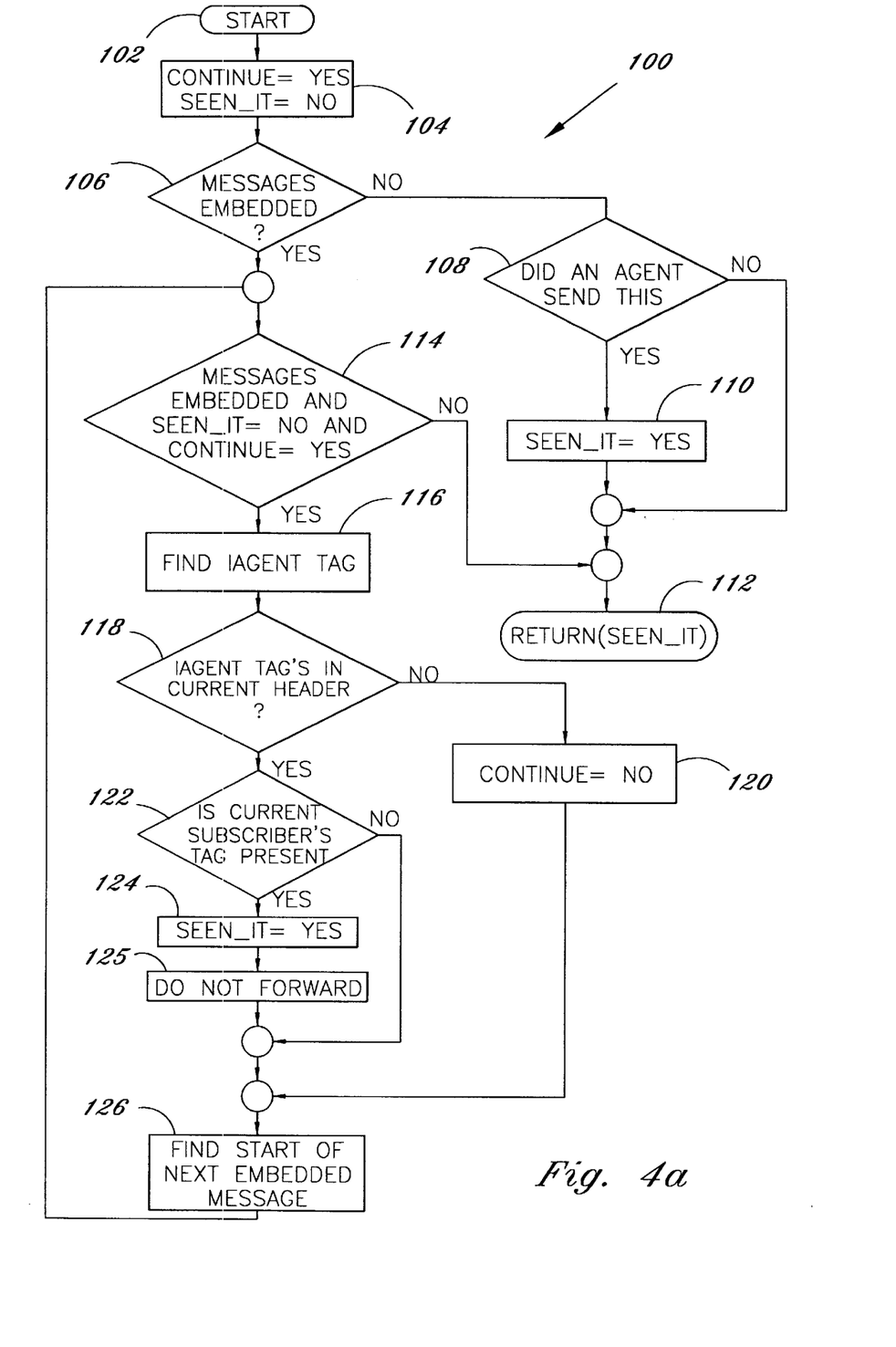
FIG. 4 is a logic flow chart illustrating the method and instruction code of the instant invention.
Figure 4B:
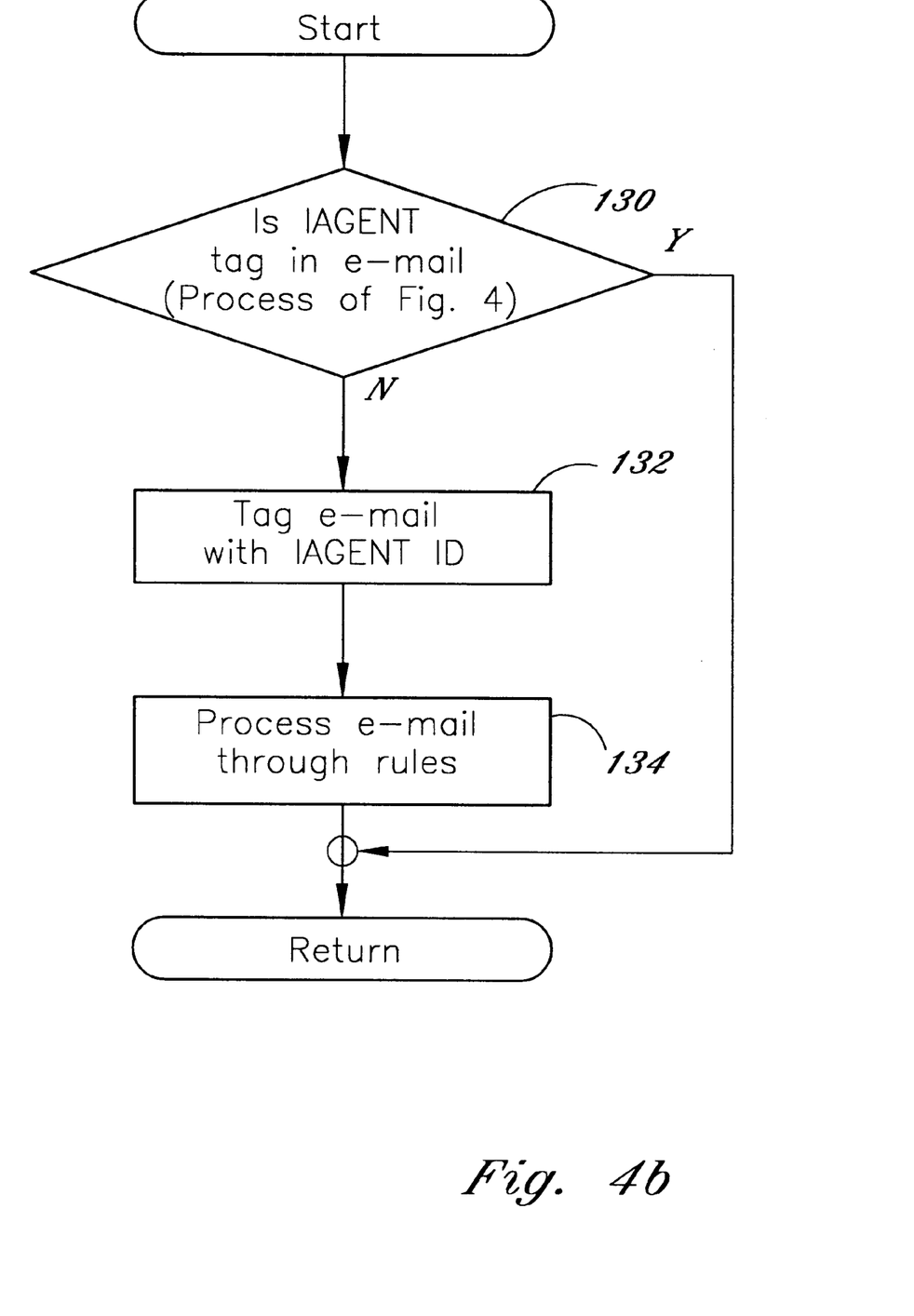

Referring to FIG. 4a, prior to routing e-mail messages 12, all flag settings are set to their default values. The "CONTINUE" flag's default is set to "YES" to initially activate the IAGENT routines 116–126 responsible for processing e-mail 12 to determine whether any of the embedded messages have an IAGENT ID 18 and whether any of the IDs 18 correspond to the cognizant subscriber. If CONTINUE is "NO," then the IAGENT routines 116–126 are deactivated. The "CONTINUE" flag is set to "NO" when an embedded message header does not have an IAGENT ID in it. This is the first header that is due to a non-automatic forwarding.

The "SEEN_IT" flag has a default setting of "NO" to tell the IAGENT that it has not processed this e-mail message 12 before and it can therefore process any rules against it that the subscriber has given the IAGENT. Once it has been determined that this IAGENT has already processed the current e-mail message 12, the SEEN_IT flag is set to YES. This, then, tells the IAGENT not to process the current e-mail message 12 through any rules the subscriber has given it.

With reference to FIG. 4a, and as noted above, the operation of the e-mail maelstrom prevention routine 100 begins with the CONTINUE and SEEN_IT flags set to their default values of YES and NO, respectively (104). An inquiry is then made as to whether the received e-mail message has messages embedded therein (106). This is done by searching for the string "\n>From" in the e-mail message. An e-mail message 12 comprises a header 13 and body 14. The body 14 contains the readable portion of the message of interest. An embedded message, as shown in FIG. 3, comprises multiple messages in a stacked arrangement whereby the first message in is the last message checked for an IAGENT ID 18. If the e-mail message does not comprise an embedded message, then the program 100 determines whether it was sent manually or by an intelligent agent 16, i.e., automatically (108). If the message was sent by an intelligent agent 16, then it is an automatic reply and this intelligent agent should not automatically forward it. This would cause a mail maelstrom as automatically generated replies would get an automatically generated reply for it ad infinitum. In this case (an automatic reply), the SEEN_IT flag is set to YES. The mail maelstrom prevention routine then returns to its caller the value of SEEN_IT (i.e., YES) so that the current e-mail message 12 will not be processed through any rules that this IAGENT's subscriber has given it.

Again referring to FIG. 4a, block 106, if there are messages embedded in this current e-mail message 12, processing continues to the loop starting at 114. As this is the first time through the loop, the condition values (SEEN_IT=NO and CONTINUE=YES) will be true, allowing the body of the loop (116–123) to execute. Block 116 looks at the current header to see if there is an IAGENT tag in it. At 118, the determination is made as to whether or not this is true and if it is, this embedded message was manually forwarded and the mail maelstrom detection routine need not look any further for this cognizant subscriber's IAGENT ID tag in the embedded messages. So, block 120 sets the CONTINUE flag to NO to stop the loop at block 114. When this occurs, the current value of SEEN_IT will be returned to the caller of the mail maelstrom detection routine 100 at 112.

When the determination is made that there is an IAGENT ID tag in the current header at block 118, block 122 is executed. Block 122 checks the value of the IAGENT ID tag to see if it is equal to the ID of the cognizant subscriber's. If it is, block 124 is executed to set the SEEN_IT flag to YES, signifying that this cognizant subscriber's IAGENT has already seen this e-mail message and processed it through the rules supplied to it by the cognizant subscriber. Processing then continues with block 125. If it is not, the setting of the SEEN_IT flag to YES is bypassed and processing goes onto 126 where the next embedded message header is searched for. Processing then continues with 114.

Client/server networks are well known in the art. With reference to FIG. 2, a network server 20 includes at least one central processing unit (CPU) 21 coupled to main memory 22, at least one direct access storage device (DASD) 23, and at least one network input/output (I/O) device 24 by a bus 26. The server 20 also includes a memory disk drive 35 and at least one disk 36, or storage medium, for loading the program component into the server 20 and client units 27, 28. The program component comprises the underlying program manager responsible for routing e-mail messages 12 and the instruction code 100, 11 of the instant invention responsible for preventing infinite loops. The network I/O device 24 couples the server 20 to a plurality of client units, such as personal computer units (PC) 27, 28, or terminals, via a network communication line 29. E-mail messages may be sent between PC 27 and PC 28 via the server 20 and line 29 in a manner well known in the art. In FIG. 5, each PC unit 27, 28 may be a conventional processor having a CPU, memory, keyboard, display, floppy disk, hard disk and I/O communications port, well known in the art.

The instant invention 10 is employable in virtually any system capable of automatically forwarding messages.

These systems may include computers, networks, pagers, facsimiles and other systems known to automatically forward electronically generated messages. The code 100, 11 and theory of operation does not change in different systems. Rather, the manner in which the invention 10 communicates with the cognizant agent 16 and subscriber rules 17 may change. A preferred agent 16 which may be employed by the instant invention is shown in FIG. 6 and discussed below. It is important to note that although a user may change the rules 17 by which it automatically routes received messages, the instant invention is not subject to user interface or change and is therefore permanent. The invention 10 is intended to be adaptable to existing and new systems for preventing continuous looping as discussed herein.

The agent 16 utilized by the instant invention 10 creates or maintains a table of actions. It describes how a user may, via prompts, indicate which events are deemed triggering events and which are operational actions. Each table entry (record) contains a field like "action type" whose value may be "trigger" or "operation." An operation is an action committed as the result of a trigger. A trigger, in contrast, is an action potentially resulting in the commission of other actions. The agent 16 contains a Media Programming Interface (MPI) which interfaces with the attributes, devices, objects, and actions to permit monitoring different routine office tasks. The agent 16 also contains an association builder which builds associations among the various entities. To relate this to the instant invention, a trigger would be an incoming e-mail message and an operation would be to automatically forward the e-mail message on to another subscriber.

An intelligent agent preferably employed is shown in FIG. 6. FIG. 6 illustrates certain software components of a preferred form of the intelligent agent in stacks 30, 31 which interact to handle e-mail messages, create a record of actions automatically taken by the agent for each message, and inject that record into the body of the message itself. FIG. 6 shows a server stack 30 and a client stack 31 that utilizes the client interface 44 stored in main memory 22 of network server 20. A client stack (not shown) similar to client stack 31 is stored in the main memory of each of the PCs 27 and 28 and utilizes the user interface 40 during normal operation of the network. The server stack 30 includes the following software components: communications protocol 45, message handler 48, event manager 50, rule exporter 52, rule catcher 54, database manager 56, database 58, inference engine 60, and action launcher 62. The client stack 31 includes software components communications protocol 46, message handler 42, user interface 40 and client interface 44. User interface 40 in each client PC 27, 28 formats the existing rules 17 and templates for rules 17 to be viewed and/or edited/created by a respective user. The user makes the association between triggers and actions. The user interface communicates with the message handler 42 by sending and receiving messages to store and retrieve the user's rules. The client interface 44 in the server unit 20 is the point where applications notify the agent that some event (trigger) has occurred for a user.

The communications protocol 45, 46 is the software layer where transmission from one stack to another stack occurs. It could be one of many means well known in the art, such as a Transmission Control Protocol/Internet Protocol (TCP/IP) stack or pipes or RPC or any other means for one process running in a computer to talk to another process running on either the same or some other computer.

The message handlers 42, 48 have two responsibilities. The first is to receive streams of data from its counterpart in other stacks and prepare them into messages to be passed up to the next software level. The second is to convert a message into a stream to pass over the network communications line 29 to its counterpart in another stack.

There are basically two types of events handled by the event manager 50. They are rules requests and trigger event notification. When a trigger event is received for a user, the event manager 50 utilizes the database manager 56 to retrieve the rules 17 of the user for whom this event is handled. It then invokes the inference engine 60 to determine if the antecedent of any rules are true. For any rules whose antecedent is true, the corresponding consequences (actions) are placed in an action list. Upon the completion of inferencing, the event manager 50 invokes the action launcher 62 to execute any actions found in the action list. The initiating object is also passed to the action launcher 62 so that it may update it with the actions that are taken.

Rules requests fall into two categories; retrieve rules and store rules. For retrieving rules, the event manager 50 interacts with the rule exporter 52 to get the rules from the database 58 via the database manager 56 and subsequently send them to the requesting client via the client stack 31 in the appropriate PC 27, 28 main memory. For storing rules, the event manager 50 interacts with the rule catcher 54 to have the rules persistently stored in the database 58.

The rule exporter 52 utilizes the database manager 56 to retrieve the persistently stored rules. It then converts the rules from their internal format (objects) to their external format (sentences) so that the user interface 40 will be able to display the rules 17 to the user. The rule catcher 54 converts the rules from their external format (sentences) to the internal formats (objects). It then utilizes the database manager 56 to store the rules persistently.

The database manager 56 provides a database independent application programming interface (API) to its clients (rule exporter 52; rule catcher 54, and event manager 50). It interfaces with the database 58 to store rules persistently. The database 58 is the persistent repository for the user's rules.

The inference engine 60 executes the antecedent of the rules to determine if the consequence should occur. If the antecedent is true, the actions in the corresponding rules consequence are placed in a list. Each action in the list that is passed by event manager 50 to the action launcher 62 is executed. Then, an agent activity record is added to the event initiating object by action launcher 62.

The interaction of these software components will be further explained by means of the following example. Today, a common usage of intelligent agents 16 is to automatically handle electronic mail (e-mail) for a person. Rules can be established of the form "If mail arrives from my boss, then page me, fax it to my secretary, and store it in the MyBoss folder," i.e., antecedent and consequence. With the intelligent agent 16 of FIG. 6 residing on a server 20, this type of activity is possible as the client hardware 27, 28 is not involved and does not even have to be powered on. The instant invention would be inserted into the segment of code compromising the event handler 50 and the action launcher 62. Prior to retrieving the cognizant subscriber's rules from the database 58 via the database manager 56, the event manager would invoke the mail maelstrom detection routine 100, FIG. 4. If the mail maelstrom detection routine 100 returns a YES, then no further processing on the current e-mail message would occur. If the mail maelstrom detection routine 100 returns a NO, then the rules would be retrieved from the database 58 via the database manager 56.

The inference engine 60 would then be invoked. If any rules were true that said to forward or reply to the e-mail message, the action launcher 62 would insert the IAGENT ID tag into the header of the newly created e-mail message whose body is the original e-mail message's header and body.

There are standards that are well known in the art that define how an e-mail should be comprised. RFC 822 (standard for the format of ARPA Internet Text Messages) specifies a syntax for text messages sent among computer users within the framework of "electronic mail." It defines a message representation protocol which specifies considerable detail about message headers, but which leaves the message content, or message body, as flat ASCII text. RFC 1341 (MIME—Multipurpose Internet Mail Extension) redefines the format of message bodies to allow multi-part textual and non-textual message bodies to be represented and exchanged without loss of information. In particular, it is designed to provide facilities to include multiple objects in a single message, such as that shown in FIG. 3.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. An electronic mail (e-mail) message processing system comprising:
   a plurality of remote stations and means for sending e-mail messages between the stations, wherein at least one of said e-mail messages comprises one or more levels of embedded messages;
   an intelligent agent corresponding to a source user and responding to the receipt of e-mail message from said stations, said agent facilitating automatic delivery of said e-mail messages from said corresponding user to at least one predetermined target user in accordance with a set of rules provided to said agent by the user; said agent inserting an automatic forwarding tag into said e-mail messages to identify that said e-mail messages is being forwarded automatically by said agent;
   means, in communication with said agent, for preventing said e-mail messages from being sent from said source user to said target user more than once so as to prevent e-mail maelstrom loops, comprising:
      means for detecting if said e-mail messages received by said agent has said one or more levels of embedded messages:
         wherein if said one or more levels of embedded messages are not detected, then any said e-mail messages containing said automatic forwarding tag that corresponds to said source user are not forwarded to said target user; and
         wherein if said one or more levels of embedded messages are detected, then each of said one or more levels of embedded messages is sequentially checked so that when an automatic forwarding tag is found and said automatic forwarding tag corresponds to said source user, said e-mail messages are not forward to said target users.

2. A system as recited in claim 1, wherein said preventing means comprises:
   means for tagging said e-mail messages with an identifier tag corresponding to said source user; and
   means for determining whether subsequently received e-mail messages contain said identifier tag to facilitate a determination of whether said e-mail message had already been sent to said target user by said source user.

3. A system as recited in claim 2, wherein said tagging means tags each e-mail message with said identifier tag prior to routing to target users and said determining means searches each received e-mail message for said identifier tag.

4. A system as recited in claim 2, wherein said identifier tag identifies said agent of said source user and said determining means allows said agent to search for said identifier tag.

5. A system as recited in claim 3, wherein said identifier tag identifies said agent of said source user and said determining means allows said agent to search for said identifier tag.

6. A system as recited in claim 2, wherein said preventing means further comprises:
   means, in communication with said determining means, for identifying other identifier tags assigned to e-mail messages by other source user's agents and for distinguishing said other identifier tags from said identifier tag.

7. In an electronic mail (e-mail) message processing system that includes a plurality of remote processor stations and automatically routes e-mail messages from a source user at one station to a target user at a second station in accordance with a set of rules provided by the source user and processed by agents unique to said source and target users, wherein at least one of said e-mail messages comprises one or more levels of embedded messages, a method comprising:
   inserting an automatic forwarding tag into said e-mail message at said source user that identifies the e-mail message is being forwarded automatically by said agent;
   preventing said e-mail message from being sent from said current source user to said target user more than once so as to prevent e-mail maelstrom loops comprising the sub-steps of:
      detecting if said e-mail messages received by said agent does not have said one or more embedded messages detected, then any said e-mail messages containing said automatic forwarding tag that corresponds to said current source user are not forwarded to said target user; and
      detecting if said e-mail messages received by said agent does have said one or more levels of embedded messages detected, then each of said one or more levels of embedded messages is sequentially checked so that when an automatic forwarding tag is found and said automatic forwarding tag corresponds to said current source user, said e-mail messages are not forward to said target users.

8. In an electronic mail (e-mail) message processing system that includes a plurality of remote processor stations and automatically routes e-mail messages from a source user (a user which transmits an e-mail message) at one station to a target user (a user which receives an e-mail message) at a second station in accordance with a set of rules provided by the source user, wherein at least one of said e-mail messages comprises one or more levels of embedded messages, an article of manufacture comprising:
   an intelligent agent corresponding to a source user and responding to the receipt of e-mail messages from the remote processor stations, said agent facilitating automatic delivery of said e-mail messages from said source user to at least one predetermined target user in accordance with a set of rules provided to the agent by the user; said agent inserting an automatic forwarding tag into said e-mail message to identify that the e-mail message is being forwarded automatically by said agent;

means, in communication with said agent, for preventing e-mail messages from being sent from said source user to said target users more than once so as to prevent e-mail maelstrom loops comprising:

means for detecting if said e-mail messages received by said agent has said one or more levels of embedded messages:

wherein if said one or more levels of embedded messages are not detected then any said e-mail messages containing said automatic forwarding tag that corresponds to said source user are not forwarded to said target user; and wherein if said one or more levels of embedded messages are detected, then each of said one or more levels of embedded messages is sequentially checked so that when an automatic forwarding tag is found and said automatic forwarding tag corresponds to said source user, said e-mail messages are not forward to said target users.

9. A system as recited in claim 8, further comprising means, in communication with said preventing means and said communicating means, for selectively directing said agent to route said e-mail messages to the target user in accordance with the set of rules provided by the source user and in response to said preventing means.

10. A system as recited in claim 9, wherein said preventing means comprises:

means for selectively tagging said e-mail messages with an identifier tag corresponding to said source user prior to routing to said target user; and means for searching subsequently received e-mail messages for said identifier tag to facilitate a determination of whether said e-mail message had already been sent to said target user by said source user.

11. A system as recited in claim 10, wherein said identifier tag identifies said agent and said searching means allows said agent to search for said identifier tag.

12. A system as recited in claim 11, wherein said preventing means further comprises:

means, in communication with said determining means, for identifying other identifier tags assigned to e-mail messages by other source user's agents and for distinguishing said other identifier tags from said identifier tag.

13. In an electronic mail (e-mail) message processing system that includes a plurality of remote processor stations and automatically routes e-mail messages from a source user (a user which transmits an e-mail message) at one station to a target user (a user which receives an e-mail message) at a second station in accordance with a set of rules provided by the source user, said e-mail messages being processed by an intelligent agent corresponding to the source user and responding to the receipt of e-mail messages from the remote processor stations, wherein at least one of said e-mail messages comprises one or more levels of embedded messages, a computer readable medium of instructions comprising:

means for inserting an automatic forwarding tag into said e-mail message to identify that the e-mail message is being forwarded automatically by said agent;

means for selectively tagging said e-mail messages with an identifier tag corresponding to said source user prior to routing to said target user;

means for searching subsequently received e-mail messages for said identifier tag to facilitate a determination of whether said e-mail message had already been sent to said target user by said source user; and means, in communication with said searching means, for selectively directing said agent to route said e-mail messages to the target user when said identifier tag is absent from said e-mail messages, said directing means operating in accordance with the set of rules provided by the source user and in response to said searching means, comprising:

means for detecting if said e-mail messages received by said agent has said one or more levels of embedded messages:

wherein if said one or more levels of embedded messages are not detected, then any said e-mail messages containing said automatic forwarding tag that corresponds to said source user are not forwarded to said target user; and wherein if said one or more levels of embedded messages are detected, then each of said one or more levels of embedded messages is sequentially checked so that when an automatic forwarding tag is found and said automatic forwarding tag corresponds to said source user, said e-mail messages are not forward to said target users.

14. A system as recited in claim 13, wherein said identifier tag identifies said agent and said searching means allows said agent to search for said identifier tag.

15. A system as recited in claim 14, wherein said directing means selectively activates a trigger authorizing routing of the e-mail messages.

\* \* \* \* \*